(12) United States Patent
Viavattine

(10) Patent No.: US 7,785,741 B2
(45) Date of Patent: Aug. 31, 2010

(54) FLAT ELECTROCHEMICAL CELLS AND METHOD FOR MANUFACTURE

(75) Inventor: Joseph J. Viavattine, Vadnais Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 1218 days.

(21) Appl. No.: 11/363,893

(22) Filed: Feb. 28, 2006

(65) Prior Publication Data

US 2007/0202401 A1    Aug. 30, 2007

(51) Int. Cl.
*H01M 6/10* (2006.01)
(52) U.S. Cl. .................. 429/209; 429/231.95
(58) Field of Classification Search .................. 429/209, 429/130, 218.1, 231.95
See application file for complete search history.

(56) References Cited

U.S. PATENT DOCUMENTS

| 5,147,737 | A | * | 9/1992 | Post et al. .................... 429/94 |
| 6,010,803 | A | * | 1/2000 | Heller et al. ................. 429/175 |
| 2005/0048363 | A1 | * | 3/2005 | Gordon et al. ............... 429/161 |
| 2007/0254212 | A1 | * | 11/2007 | Viavattine ................... 429/164 |

FOREIGN PATENT DOCUMENTS

| EP | 1039562 A | 9/2000 |
| EP | 1278253 A | 1/2003 |
| FR | 1012439 A | 7/1952 |

OTHER PUBLICATIONS

International Search Report, PCT/US2004/062385, Sep. 4, 2008, 5 Pages.

* cited by examiner

*Primary Examiner*—Jennifer Michener
*Assistant Examiner*—Monique Wills

(57) ABSTRACT

An electrochemical cell, comprising: a first electrode structure formed from a sheet of electrode material folded along a plurality of spaced apart intervals to form a U-fold structure having a plurality of spaced apart double-layer sections; and a second electrode structure spaced apart from and operatively disposed between the plurality of spaced-apart double layer sections of the first electrode structure.

14 Claims, 14 Drawing Sheets

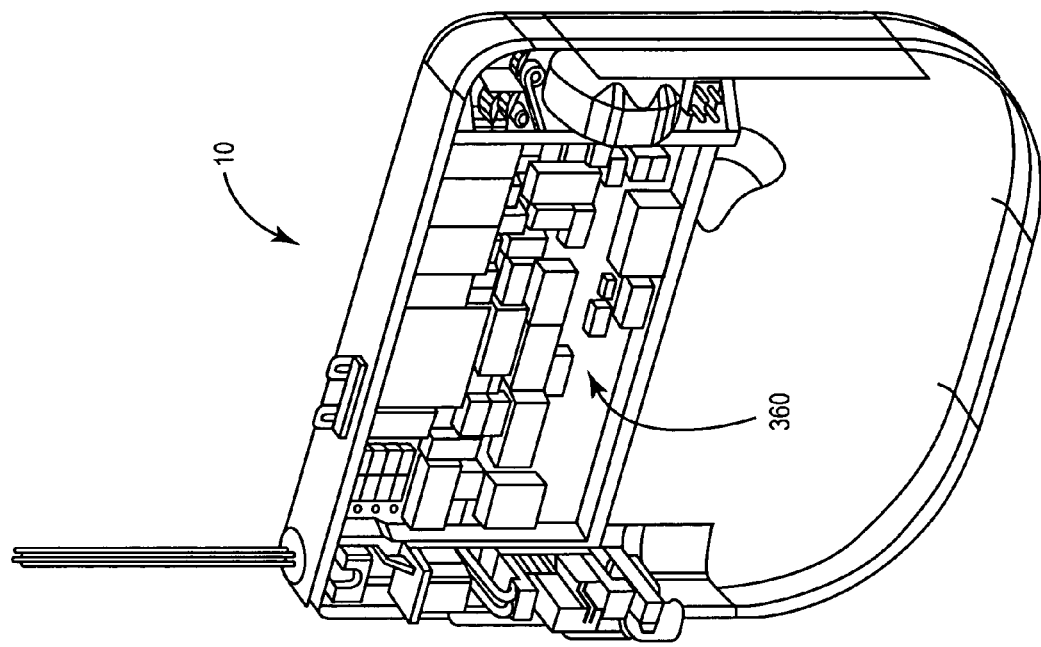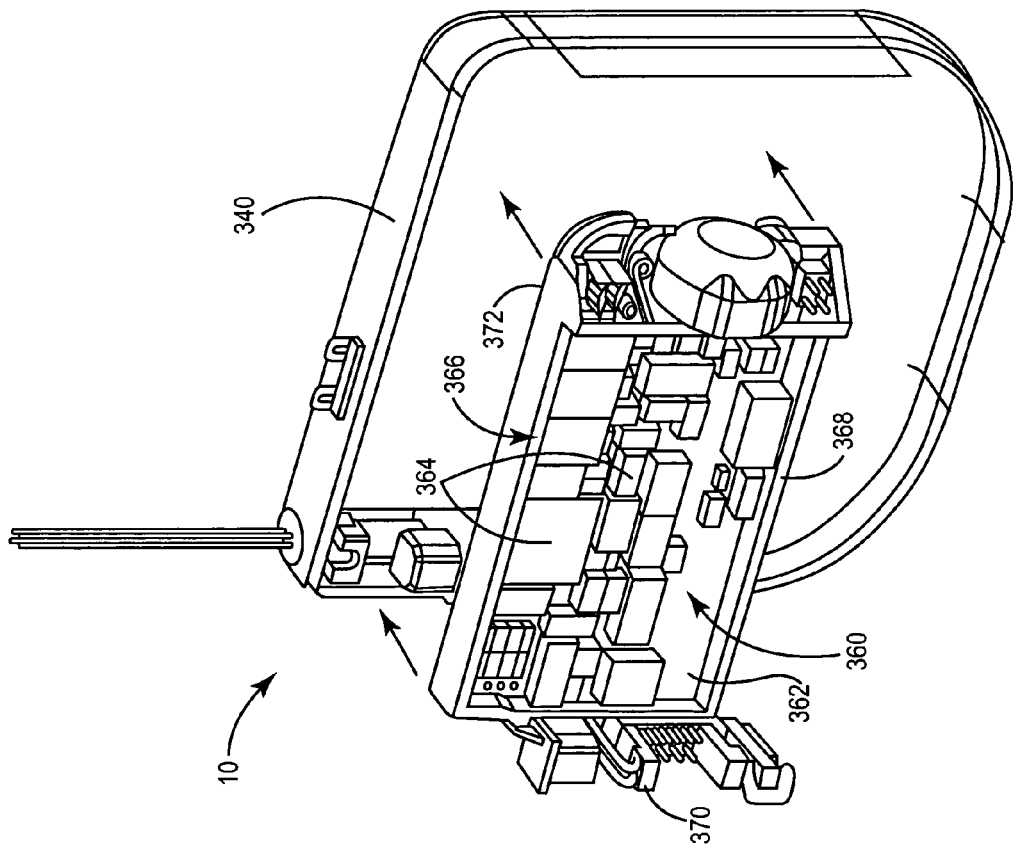

FLAT ELECTROCHEMICAL CELLS AND METHOD FOR MANUFACTURE

TECHNICAL FIELD

The invention relates generally to electrochemical cells and in particular to electrode configurations for use in flat electrochemical cells.

BACKGROUND

Implantable medical devices are used to treat patients suffering from a variety of conditions. Examples of implantable medical devices include implantable pacemakers and implantable cardioverter-defibrillators (ICDs), which are electronic medical devices that monitor the electrical activity of the heart and provide electrical stimulation to one or more of the heart chambers as necessary. Pacemakers deliver relatively low-voltage pacing pulses in one or more heart chambers. ICDs can deliver high-voltage cardioversion and defibrillation shocks in addition to low-voltage pacing pulses Pacemakers and ICDs generally include pulse generating circuitry required for delivering pacing and/or cardioversion and defibrillation pulses, control circuitry, telemetry circuitry, and other circuitry that require an energy source, e.g. at least one battery. In addition to a battery, ICDs include at least one high-voltage capacitor for use in generating high-voltage cardioversion and defibrillation pulses. Implantable medical devices (IMDs), including pacemakers, ICDs, drug pumps, neurostimulators, physiological monitors such as hemodynamic monitors or ECG monitors, typically require at least one battery to power the various components and circuitry used for performing the device functions.

IMDs are preferably designed with a minimal size and mass to minimize patient discomfort and prevent tissue erosion at the implant site. Batteries and capacitors, referred to collectively herein as "electrochemical cells," contribute substantially to the overall size and mass of an IMD. Electrochemical cells used in IMDs are provided with a hermetically-sealed encasement for housing an electrode assembly, including an anode and cathode separated by a separator material, an electrolyte, and other components such as electrode connector feed-throughs and lead wires. The encasement includes a case and a cover that are sealed after assembling the cell components within the case.

The total amount of the anode and cathode material required in the cell will depend on the energy density, volume, voltage, current, energy output, and other requirements of the cell for a particular application. Anode and cathode material, with an intervening separator, may be arranged in a coiled electrode assembly. Both round and flat cylindrical coiled electrode assemblies are known in the art. Flat electrochemical cell designs tend to improve the volumetric efficiency of the cell because they are generally better suited for fitting within an IMD housing with other device components. Flat electrochemical cell designs may utilize a stacked electrode assembly wherein anode, cathode and intervening separator material are arranged in a stacked configuration. In stacked configurations, separate electrode layers or plates, which are often generally rectangular in shape and aligned in a stack, need to be interconnected. While the stacked configurations may improve volumetric efficiency, multiple interconnections can add to the complexity of cell assembly. The use of multiple, separate electrode layers can also contribute to tolerance stack-up, which may alter the balance of the anode and cathode material available and add undesired mass to the cell.

A serpentine anode design addresses some of these limitations in that a serpentine folded anode generally requires fewer interconnections and fewer piece parts reducing tolerance stack-up. For example, a lithium foil anode may be wrapped through cathode layers in a serpentine fashion. Since inner wraps face cathode material on both sides, a thicker piece of lithium foil is generally used for the inner wraps. The outermost wraps face cathode material on one side requiring a thinner lithium foil in a lithium-balance battery. The serpentine anode material will face opposing cathode material on both sides requiring a sheet of anode material on both sides of a collector. As such, a serpentine anode formed of lithium foil for use in a battery generally requires at least three pieces of lithium in two different thicknesses.

As it is desirable to minimize overall IMD size, electrochemical cell designs that allow cell size and mass to be reduced are desirable. Reduction of electrochemical cell size may allow balanced addition of volume to other IMD components, thereby increasing device longevity and/or increasing device functionality. Other electrochemical cell design considerations motivating new cell designs include reducing manufacturing cost, time and complexity.

BRIEF DESCRIPTION OF THE DRAWINGS

FIGS. 3(a) through 3(g) show perspective views of various components of an IMD as those components are placed successively within a housing of the IMD.

DETAILED DESCRIPTION

In the following description, references are made to illustrative embodiments for carrying out the invention. It is understood that other embodiments may be utilized without departing from the scope of the invention.

Figure 1:
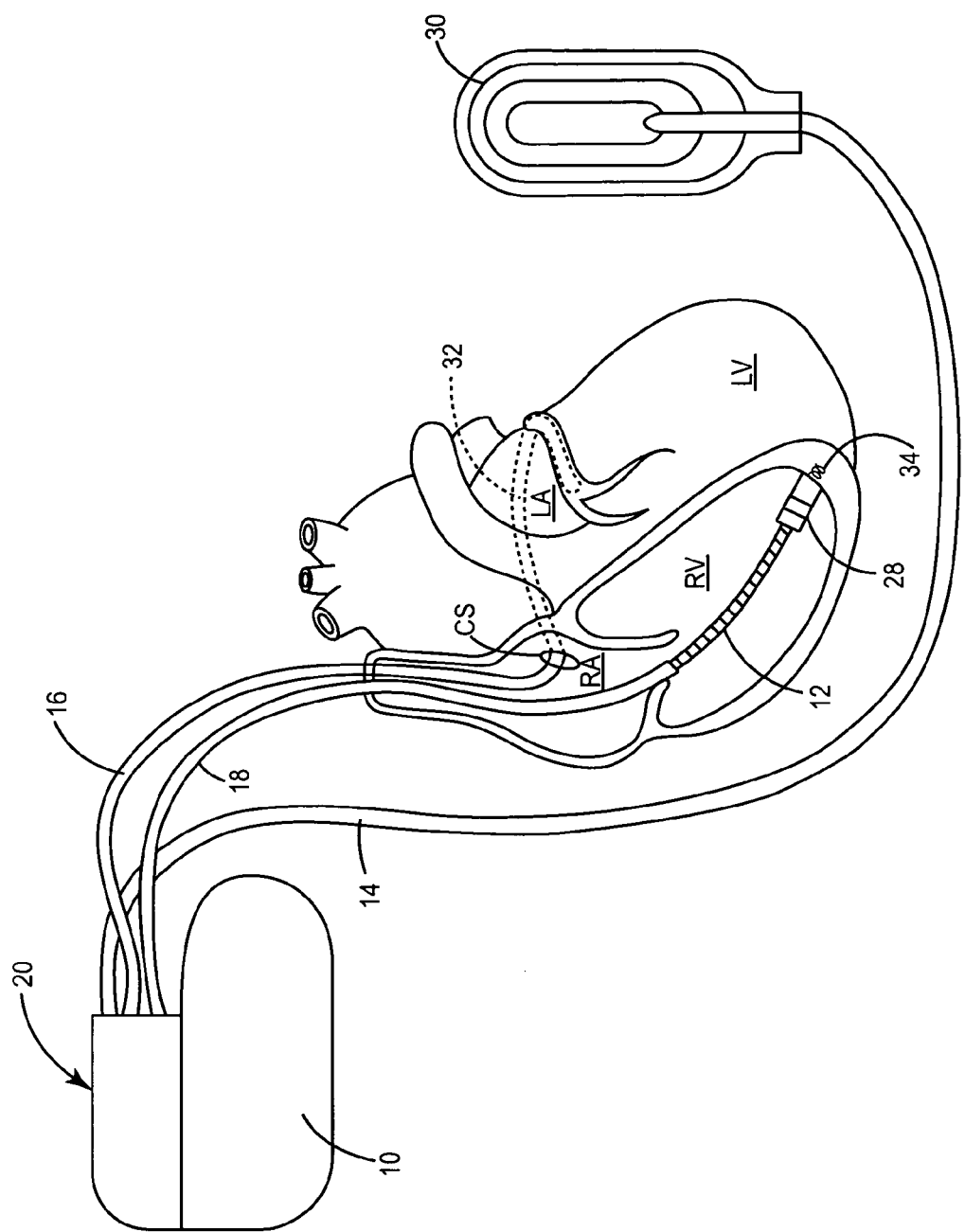
FIG. 1 illustrates an exemplary implantable medical device according to one embodiment of the invention.

FIG. 1 illustrates one example of an implantable medical device according to one embodiment of the invention. IMD 10 is embodied as an ICD and is shown with associated electrical leads 14, 16 and 18 and their operative relationship to a human heart. The leads are coupled to IMD 10 by means of multi-port connector block 20, which contains separate connector ports for each of the three leads illustrated. Lead 14 is coupled to subcutaneous electrode 30, which is intended to be mounted subcutaneously in the region of the left chest. Lead 16 is a coronary sinus lead employing an elongated coil electrode 32 which is located in the coronary sinus and/or great cardiac vein region of the heart. The location of the coronary sinus electrode 32 may be anywhere along the heart from a point within the opening of the coronary sinus (CS) to a point in the vicinity of the left atrial (LA) appendage or left ventricle (LV).

Lead 18 is provided with elongated coil electrode 12 which is disposed in the right ventricle of the heart. Lead 18 also includes a tip electrode 34 and ring electrode 28 available for pacing and sensing in the right ventricle. While one lead system having a particular electrode arrangement is shown in FIG. 1, numerous lead systems with varying electrode configurations are possible and known in the art for use with an ICD or other IMDs used for delivering cardiac stimulation pulses.

In the system illustrated, cardiac pacing pulses can be delivered in the right ventricle (RV) between tip electrode 34 and ring electrode 28. Electrodes 28 and 34 can also be employed to sense electrical signals for detecting the heart rhythm. High-voltage defibrillation or cardioversion pulses may be delivered as needed using any of the right ventricular coil electrode 12, coronary sinus coil electrode 32, and subcutaneous patch electrode 30. In some embodiments, the housing of IMD 10 is used as a "case" or "can" electrode in combination with any of the high-voltage electrodes for delivering defibrillation or cardioversion shocks.

Figure 2:
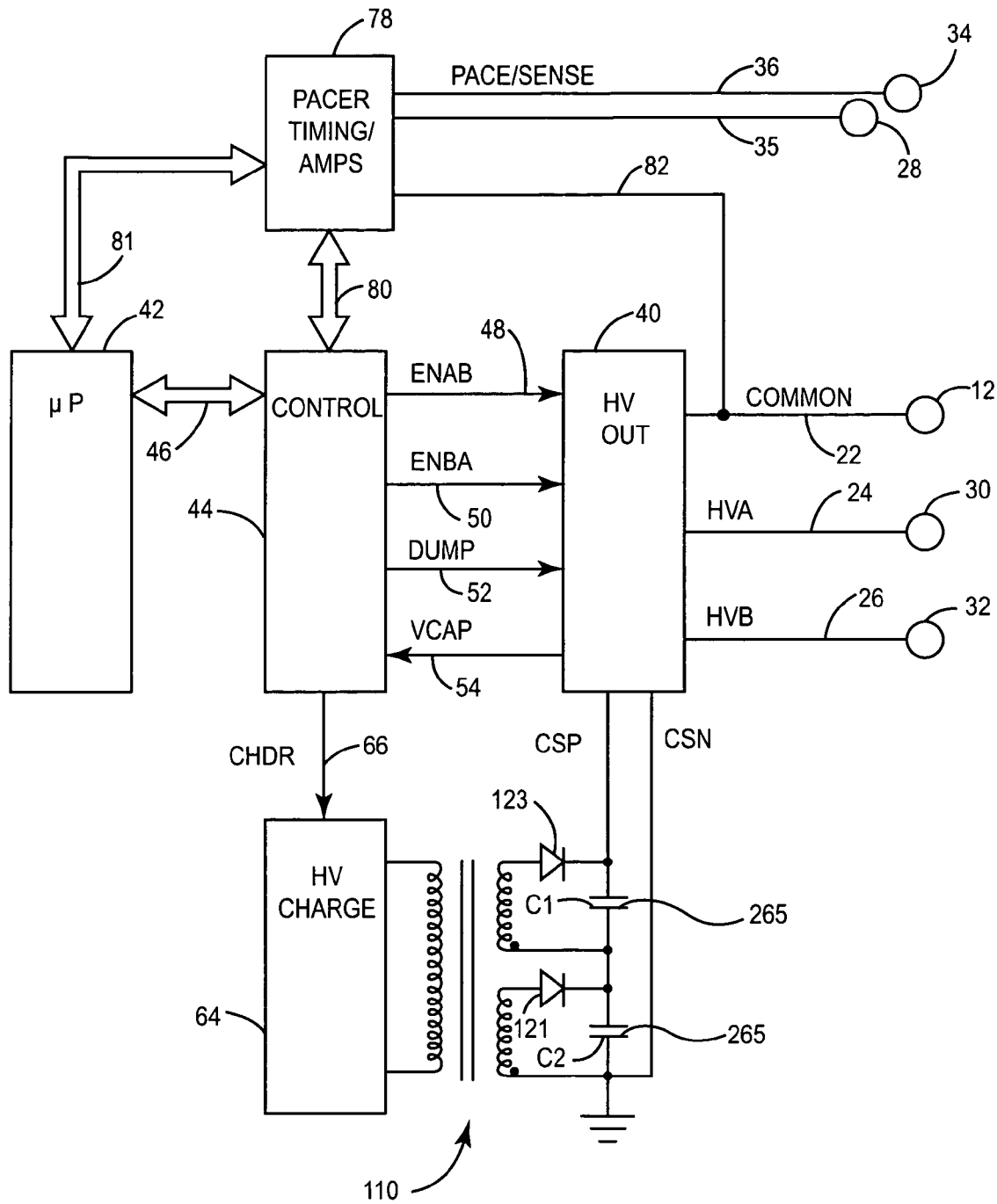
FIG. 2 is a functional block diagram of an exemplary IMD shown in FIG. 1.

FIG. 2 is a functional block diagram of one embodiment of IMD 10 shown in FIG. 1, illustrating the interconnection of high voltage output circuit 40, high voltage charging circuit 64 and capacitors 265. IMD 10 includes a control system typically in the form of a microprocessor 42, which performs all necessary computational functions within the device. Microprocessor 42 is linked to control circuitry 44 by means of bidirectional data/control bus 46, and thereby controls operation of the high voltage output circuitry 40 and the high voltage charging circuitry 64. On reprogramming of the device or on the occurrence of signals indicative of delivery of cardiac pacing pulses or of the occurrence of cardiac contractions, pace/sense circuitry 78 signals microprocessor 42 to perform any necessary mathematical calculations, to perform tachycardia and fibrillation detection procedures and to update the time intervals controlled by the timers in pace/sense circuitry 78.

The basic operation of such a system in the context of an ICD may correspond to any system known in the art. Control circuitry 44 provides signals to high voltage output circuitry 40. Those signals include control signals, labeled here as ENAB line 48, ENBA line 50, and DUMP line 52 which initiates discharge of the output capacitors and VCAP line 54 which provides a signal indicative of the voltage stored on the output capacitors 265 to control circuitry 44. High voltage electrodes 12, 30 and 32 illustrated in FIG. 1, above, are shown coupled to output circuitry 40 by means of conductors 22, 24 and 26. For ease of understanding, those conductors are also labeled as "COMMON", "HVA" and "HVB". However, other configurations are also possible. For example, subcutaneous electrode 30 may be coupled to HVB conductor 26, to allow for a single pulse regimen to be delivered between electrodes 12 and 30. During a logic signal on ENAB line 48, a cardioversion/defibrillation pulse is delivered between electrode 30 and electrode 12. During a logic signal on ENBA line 50, a cardioversion/defibrillation pulse is delivered between electrode 32 and electrode 12.

The output circuitry includes a capacitor bank, including capacitors C1 and C2 labeled collectively as 265 and diodes 121 and 123, used for delivering high-voltage pulses to the electrodes. Alternatively, the capacitor bank may include a further set of capacitors as is known in the art. In FIG. 2, capacitors 265 are illustrated in conjunction with high voltage charging circuitry 64, controlled by the control/timing circuitry 44 by means of CHDR line 66. As illustrated, capacitors 265 are charged by means of a high frequency, high voltage transformer 110. Proper charging polarities are maintained by means of the diodes 121 and 123. VCAP line 54 provides a signal indicative of the voltage on the capacitor bank, and allows for control of the high voltage charging circuitry and for termination of the charging function when the measured voltage equals the programmed charging level.

Pace/sense circuitry 78 includes a sense amplifier used for sensing R-waves, as is known in the art. Pace/sense circuitry 78 also includes a pulse generator for generating cardiac pacing pulses, which may also correspond to any known cardiac pacemaker output circuitry and includes timing circuitry for defining pacing intervals, refractory intervals and blanking intervals, under control of microprocessor 42 via control/data bus 80.

Control signals triggering generation of cardiac pacing pulses by pace/sense circuitry 78 and signals indicative of the occurrence of R-waves, from pace/sense circuitry 78 are communicated to control circuitry 44 by means of a bi-directional data bus 80. Pace/sense circuitry 78 is coupled to tip electrode 34 and ring electrode 28, illustrated in FIG. 1, by respective conductors 35 and 36. Pace/sense circuitry 78 may also be coupled to right ventricular coil electrode 12 by a conductor 82, allowing for sensing of R-waves between electrodes 34 and 28 and for delivery of pacing pulses between electrodes 34 and 28.

The capacitor cells 265 include an anode, a cathode, an electrolyte operatively associated with the anode and the cathode, and a separator disposed between the anode and cathode. The separator prevents internal electrical short circuit conditions while allowing sufficient movement of the electrolyte within the cell. The capacitor cells 265 provide the charge necessary to HV output circuitry 40 for generating high voltage defibrillation/cardioversion shocks as needed. In some embodiments of the invention, the capacitor cells 265 may correspond to any high-voltage capacitor cells known for use in IMDs, including capacitors having coiled or stacked electrode assemblies. Alternatively, capacitor cells 265 may include a U-fold electrode structure as will be described herein.

Figure 3C:
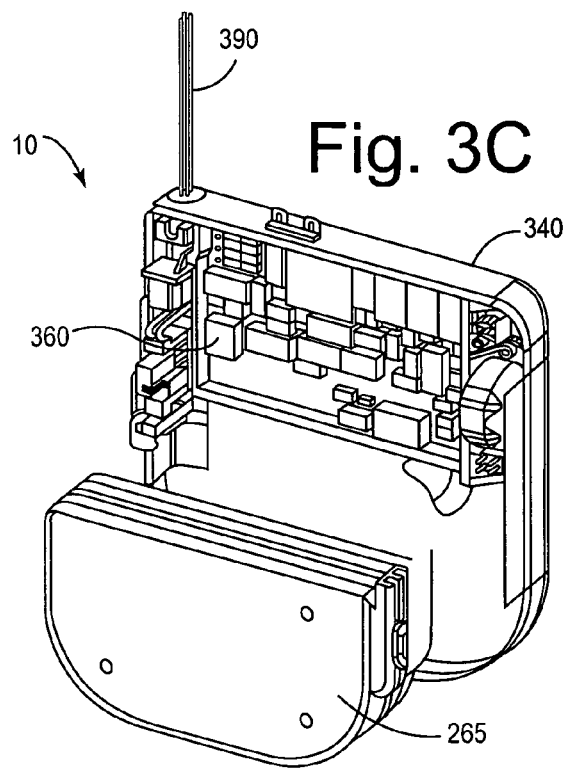

FIGS. 3(a) through 3(g) show perspective views of various components of IMD 10 as those components are placed successively within a housing 330 of IMD 10. Electronic components included in IMD 10, including those represented in the functional block diagram of FIG. 2, require a power supply which is provided as a substantially flat battery according to one embodiment of the invention. As will described in conjunction with FIGS. 3(a) through 3(g), IMD 10 includes housing 330 formed from a right-hand shield 340 and a left hand shield 350, an electronics module 360 and a substantially flat battery 380. In FIG. 3(a), electronics module 360 is placed in right-hand shield 340 of IMD 10. FIG. 3(b) shows IMD 10 after electronics module 360 has been seated in right-hand shield 340.

Electronics module 360 can assume a wide variety of forms and generally includes a circuit board maintaining and interconnecting electrical components. The exact composition of electrical components can vary from application to application, as is known in the art, but is generally configured to perform various sensing or monitoring routines, as well as to store data related to operation of IMD 10, such as therapy delivery operations.

Figure 3D:
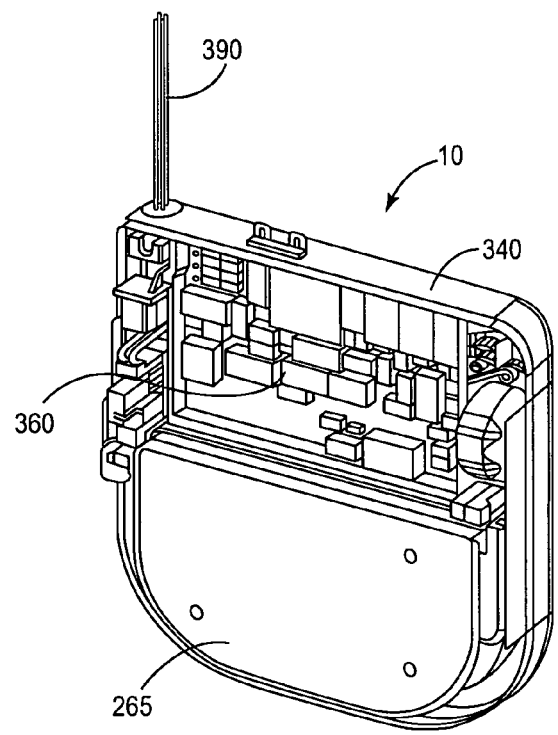

FIG. 3(c) shows capacitor 265 prior to being placed within right-hand shield 340. Capacitor 265 may include a pair of capacitors connected electrically in series by interconnections in electronics module 340. Capacitor 265 is embodied as a stacked capacitor configuration, including a U-fold electrode structure in one embodiment of the invention. Alternatively, capacitor 265 can assume other forms known in the art such as a photoflash capacitor, a cylindrical capacitor, etc. FIG. 3(d) shows IMD 10 once capacitor 265 has been placed within right-hand shield 340.

Figure 3E:
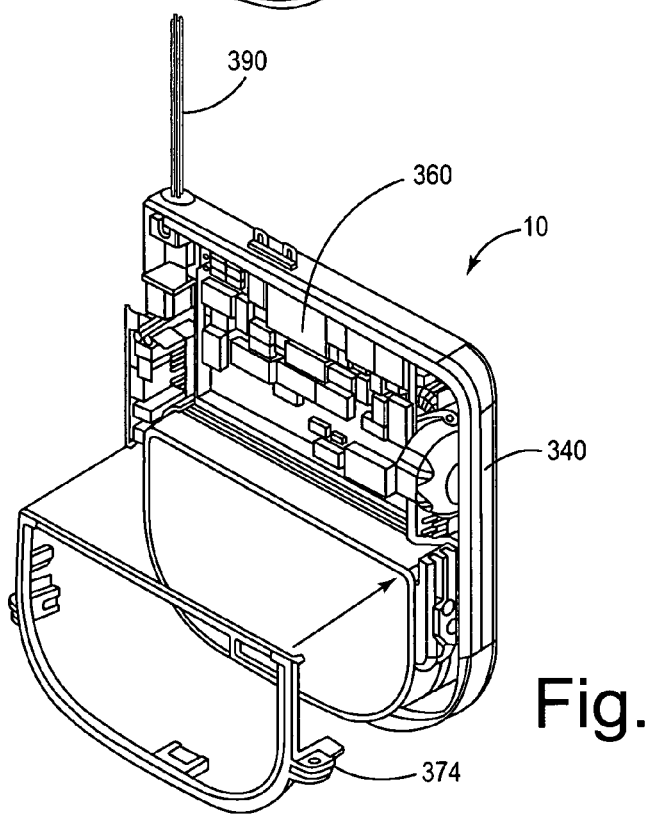
Figure 3F:
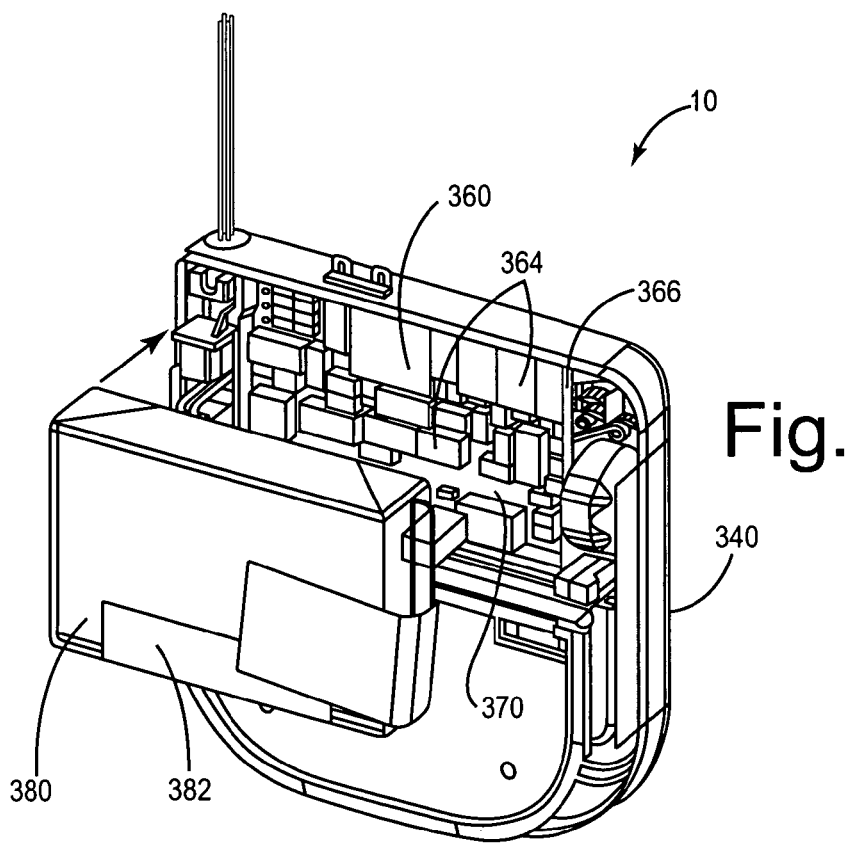

FIG. 3(e) shows an insulator cup 370 prior to its placement atop capacitor 265 in right-hand shield 340. FIG. 3(f) shows battery 380 having insulator 382 disposed therearound prior to placement in shield 340. Battery 380 provides the electrical energy required to charge and re-charge capacitors 265, and also powers electronics module 360.

Battery 380 is generally a high-capacity, high-rate, battery having flat stacked electrode configuration. According to one embodiment of the invention, battery 380 includes a U-fold electrode structure as will be described herein. In other embodiments, battery 380 may be provided as any known battery configuration, including coiled, stacked, or slug type electrode assemblies.

Figure 3G:
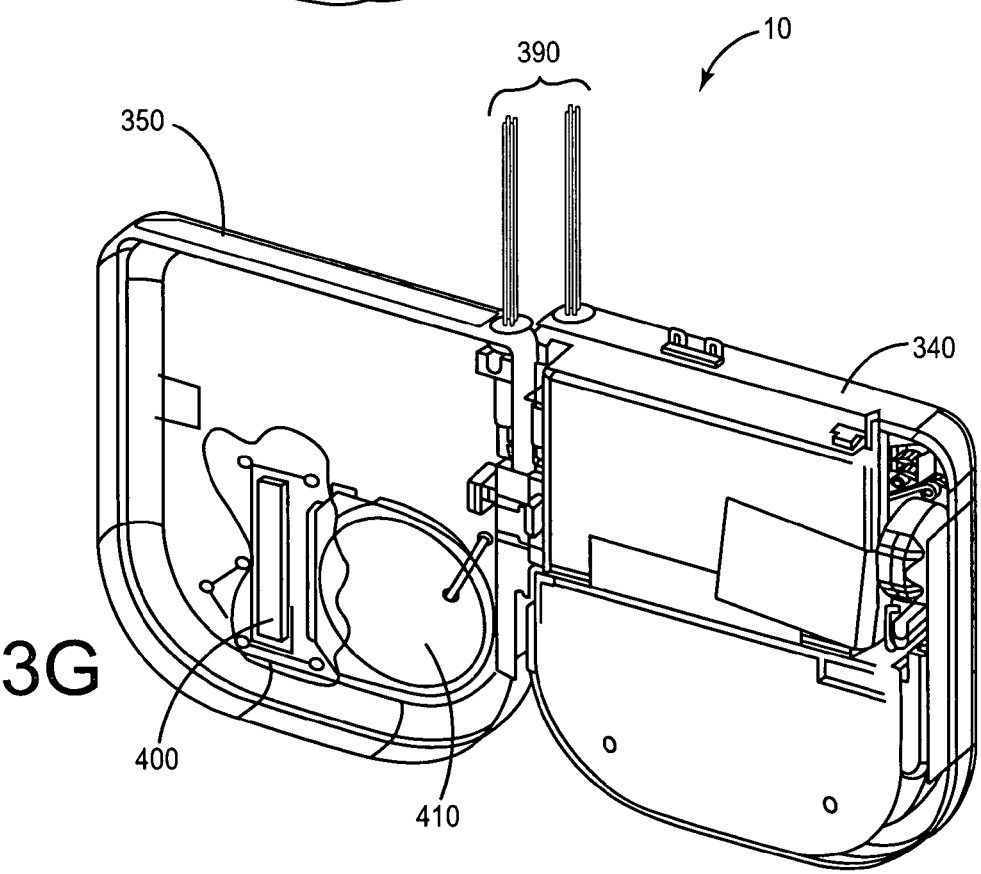

FIG. 3(g) shows IMD 10 having left-hand shield 350 connected to right-hand shield 340 and feedthrough 390 projecting upwardly from both shield halves. An optional activity sensor 400 and patient alert apparatus 410 are shown disposed on the side lower portion of left-hand shield 350. Left-hand shield 350 and right-hand shield 340 are subsequently closed and hermetically sealed.

Embodiments of the present invention are not limited to the illustrative embodiments of an IMD as represented by FIGS. 1 through 3g. It is recognized that numerous types and configurations of IMDs are available in which an electrochemical cell including a U-fold electrode structure may be included. As such, various embodiments of the invention may include other types of IMDs, such as pacemakers, drug pumps, physiological monitors, neuromuscular stimulators etc., which rely on an electrochemical cell for providing energy needed for performing device functions.

Figure 4:
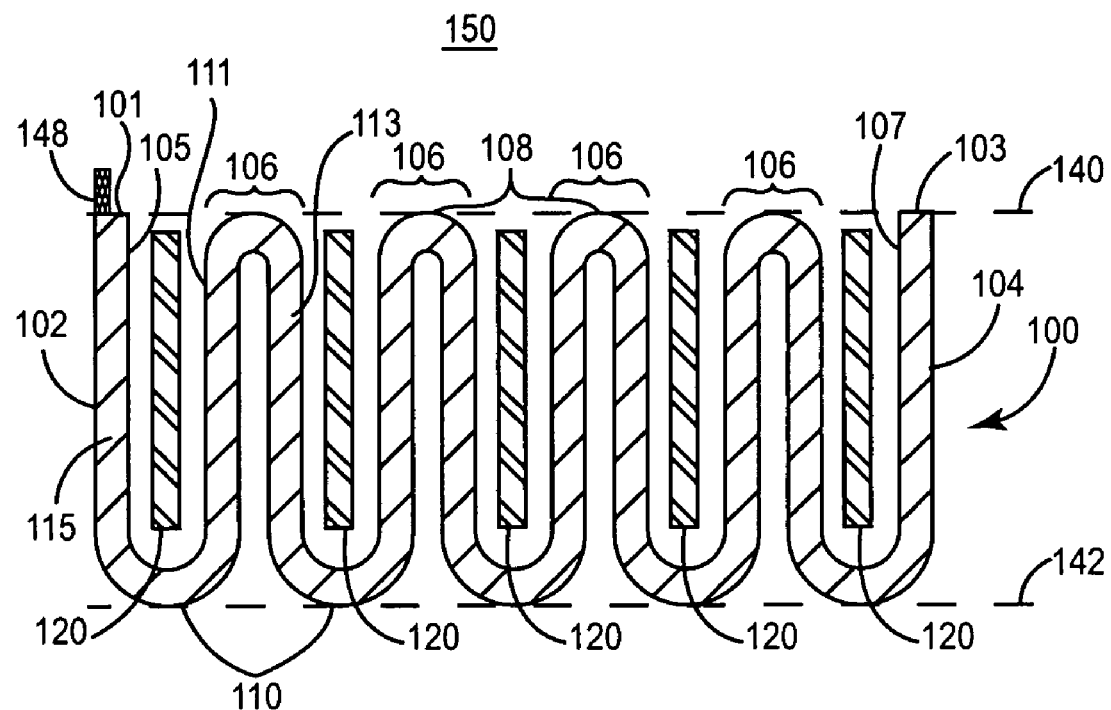
FIG. 4 is a side view of a U-fold electrode structure for use in an exemplary electrochemical cell.

FIG. 4 is a side view of a U-fold electrode structure for use in an electrochemical cell according to one embodiment of the invention. U-fold electrode structure 100 is fabricated from a sheet of electrode material 115. U-fold electrode structure may serve as an anode or a cathode in an electrochemical cell. In one embodiment, U-fold electrode structure 100 is embodied as an anode formed from a single, elongated sheet of lithium foil for use in battery 380 (FIG. 3f). In another embodiment, U-fold electrode structure 100 is embodied as a cathode formed from a single, elongated sheet of aluminum foil for use in capacitor 265 (FIG. 3c). Alternatively, any suitable conductive material known for use in electrochemical cells and available in the form of a flexible, foldable sheet can be used for fabricating U-fold electrode structure 100 for use as an anode or cathode in an electrochemical cell.

The U-fold electrode structure 100 includes a single-layer section 102 near one end 101 of sheet 115, multiple spaced-apart, double-layer sections 106, and a second single-layer section 104 located near the second end 103 of sheet 115. The double-layer sections 106 are formed by small-radius folds 108 formed at spaced apart intervals along the elongated sheet 115. The double-layer sections 106 are spaced apart from each other and from the single-layer sections 102 and 104 by large-radius folds 110.

Figure 5:
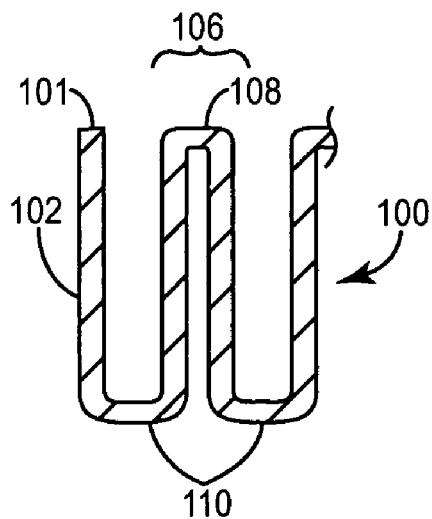
FIG. 5 is a partial side view of an alternate embodiment of a U-fold electrode structure.

The terms "small-radius" and "large-radius" used with regard to folds 108 and 110, respectively, are intended to differentiate the relative spacing between two portions of sheet 115 that are made substantially parallel by one of the folds 108 or 110. The term "small-radius" fold refers to folds 108 forming the narrowly spaced parallel portions of sheet 115 which form double layer sections 106. The term "large-radius" fold refers to a fold 110 forming more widely spaced parallel portions of sheet 115. The more widely spaced parallel portions formed by fold 110 each form a part of two adjacent, spaced-apart double-layered sections 106. While the term "radius" is used in referring to the small-radius folds 108 and large-radius folds 110, the use of the term "radius" in referring to the relative size of folds 108 and 110 is not intended to limit the general shape of folds 108 and 110 to a rounded shape. It is recognized that the shape of folds 108 and 110 in some embodiments may correspond to an arc of a generally circle or oval shape. These embodiments may result in a U-shape formed by the fold and the two parallel sections adjacent the fold. However in other embodiments, small-radius or narrow folds 108 and large-radius or wide folds 110 may be formed with substantially squared corners, for example, as generally shown in FIG. 5. It is appreciated that the general shape of folds 108 and 110 for forming double-layer sections and spaced apart sections of U-fold structure 100 may vary and is not limited to that shown in the drawings provided here for illustrative purposes.

In FIG. 4, a second electrode 120 formed as separate plates is shown arranged between the spaced-apart sections 102, 104 and 106 of U-fold electrode structure 100. In one embodiment, U-fold electrode structure 100 is an anode and electrode 120 is a cathode. In a particular example, the U-fold electrode structure 100 and separate plate electrode 120 form an anode/cathode electrode assembly 150 for use in a substantially flat battery cell in which the U-fold anode 100 is formed from lithium foil and the cathode 120 is formed from silver vanadium oxide. However, it is recognized that numerous suitable chemical compositions are possible. For example, suitable anode materials may include any active metal including any alkali or alkaline earth metal or any valve metal.

Suitable cathode materials include metal oxides such as vanadium oxide, silver vanadium oxide, or manganese dioxide, thermally treated electrolytic materials such as manganese dioxide, carbon monofluoride and hybrids thereof. A cathode material may be pressed to form porous solid cathodes, as known in the art. Such cathodes are typically made by mixing one or more active components with carbon and polytetrafluorethylene and pressing those components to form a porous solid structure.

It is to be understood, however, that electrochemical cell systems other than those set forth explicitly above may be employed including, but not limited to, cathode/anode systems such as: silver vanadium oxide and carbon monofluoride/lithium; silver oxide/lithium; magnesium oxide/lithium; vanadium oxide/lithium; copper silver vanadium oxide/lithium; copper oxide/lithium; lead oxide/lithium; carbon monoflouride/lithium; chromium oxide/lithium; bismuth-containing oxides/lithium and lithium ion rechargeable batteries.

The double layer sections 106 of U-fold electrode structure 100 face opposing electrode material on both sides 111 and 113 of double-layer section 106. The single-layer sections 102 and 104 face opposing electrode material on one side 105 of single-layer section 102 and one side 107 of single-layer section 104. U-fold electrode structure 100 can be formed from a single sheet 115 of electrode material while still maintaining a desired balance of electrode material relative to the inter-spaced opposing electrode plates 120.

While a particular number of double-layer sections 106 are shown in FIG. 4, it is recognized that the number of double-layer sections 106 included in a U-fold electrode structure and corresponding number of separate plates included in electrode 120 will depend on the energy density, volume, voltage, current, energy output and other requirements of the particular application. Likewise, the thickness of elongated sheet 115, and resulting thickness of double-layer sections 106 and single-layer sections 102 and 104, will depend on the amount of opposing electrode material 120 present and will vary depending on whether the cell is designed to be an anode- or cathode-limited cell.

Electrode structure 100 is shown having a connector tab 148 located along one end 101 of elongated sheet 115 to facilitate electrical connection of electrode structure 100 to electronics module 360 (FIG. 3a). Connector tab 148 is typically coupled to a feedthrough extending outside a hermetically sealed encasement in which electrode assembly 150 is enclosed. Since U-fold electrode structure 100 is formed from one continuous sheet of electrode material, only a single connection tab 148 is needed. While connector tab 148 is shown located along end 101, tab 148 may be located at alternative locations along the periphery of sheet 115 determined most suitable for a particular electrochemical cell configuration for facilitating electrical connection of electrode structure 100.

The separate plates forming opposing electrode 120, as shown in FIG. 4, may be arranged as discrete plates or electrically connected by connector tabs, in pairs, in a butterfly configuration, or multiple plates connected together. Any method known in the art may be used for connecting separate electrode plates 120. Furthermore, it is recognized that opposing electrode 12 may be provided in a variety of configurations, such as a second electrode structure or a serpentine structure as will be described further below.

Figure 6:
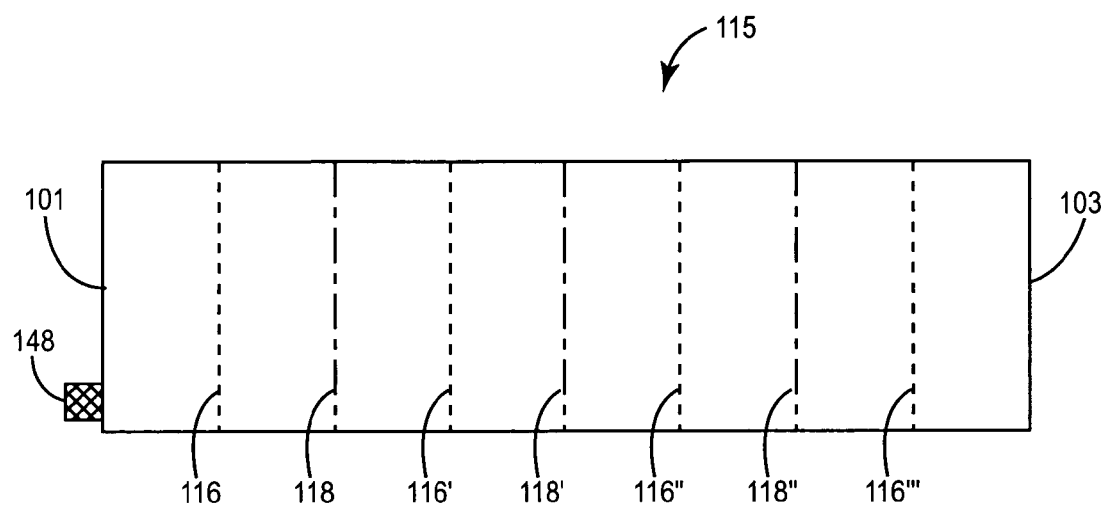
FIG. 6 is a top view of a sheet of electrode material illustrating spaced apart intervals along which the sheet is folded to form the U-fold electrode structure shown in FIG. 4.

FIG. 6 is a top view of an elongated sheet 115 of electrode material illustrating spaced apart intervals 116 and 118 along which sheet 115 is folded to form the U-fold electrode structure 100 shown in FIG. 4. Elongated sheet 115 is folded at spaced apart intervals 116, 116', 116", and 116''' with a relatively large-radius fold 110 (shown in FIG. 4) which separates the spaced apart double layer sections 106 from each other and the single layer end sections 102 and 104. Elongated sheet 115 is folded at spaced apart intervals 118, 118', 118" with a smaller-radius fold 108 (shown in FIG. 4) to form the double-layer sections 106.

Figure 7:
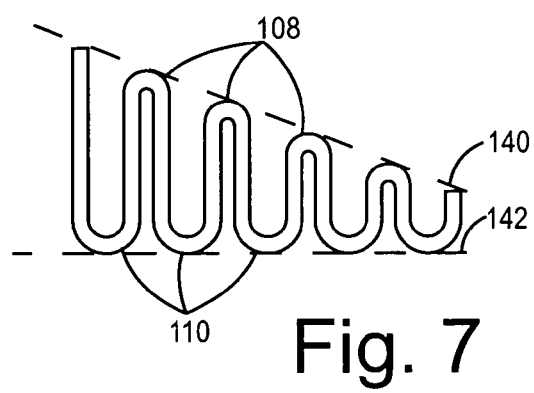
FIG. 7 is a side view of a U-fold electrode structure formed by folding a sheet of electrode material at progressively decreasing spaced apart intervals.

Generally, large-radius folds 110 and smaller-radius folds 108 are located at equally spaced intervals 116 and 118. Folds performed at equally-spaced intervals 116 and 118 will result in a U-fold electrode structure 100 having a top side 140 and bottom side 142 that are parallel as shown in FIG. 4. In other embodiments, the U-fold structure 100 may be formed by folding sheet 115 at unequal, spaced apart intervals, in which case top side 140 and bottom side 142 would not be parallel. For example, as shown in FIG. 7, if the large-radius and small-radius folds 108 are formed at progressively decreasing spaced apart intervals, top side 140 can be formed at an angle relative to bottom side 142 resulting in a U-fold electrode structure having a tapered shape. Other contours of the top side 140 and bottom side 142 can be formed according to the dimensions of the spaced apart intervals 116 and 118.

Figure 8:
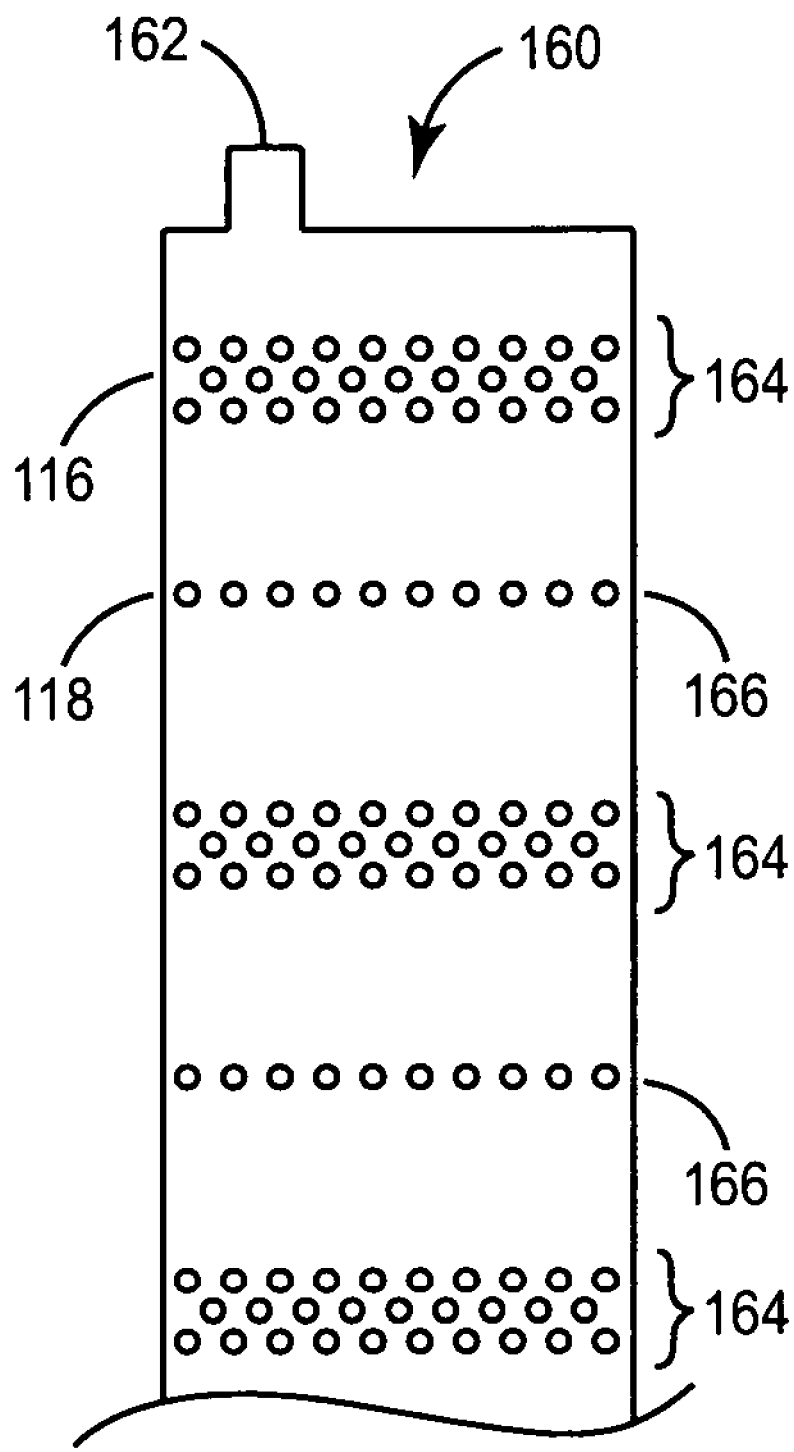
FIG. 8 is a top view of a collector that may be included in a U-fold electrode structure.

FIG. 8 is a top view of a collector that may be included in a U-fold electrode structure. Collector 160 is formed from any suitable conductive material and is provided with a connector tab 162 to facilitate electrical connection of the U-fold electrode structures 100 to a feedthrough extending outside of the electrochemical cell encasement. Electrode material, for example a lithium foil or other suitable metal foil, is pressed against or otherwise adhered to collector 160 to form an electrode subassembly. The collector and electrode subassembly may then be folded as described above to form a U-fold electrode structure.

In some embodiments, collector 160 may be perforated along spaced-apart folding intervals 116 and 118 for facilitating folding of the collector and electrode subassembly. A first set of perforations 164 is provided along an interval 116 at which the collector and electrode material composite will be folded with a relatively large radius to separate two adjacent sections of the U-fold structure. A second set of perforations 166 is provided along an interval 118 at which the collector and electrode material composite will be folded with a relatively small radius to form a double-layer section of the U-fold structure.

Figure 9:
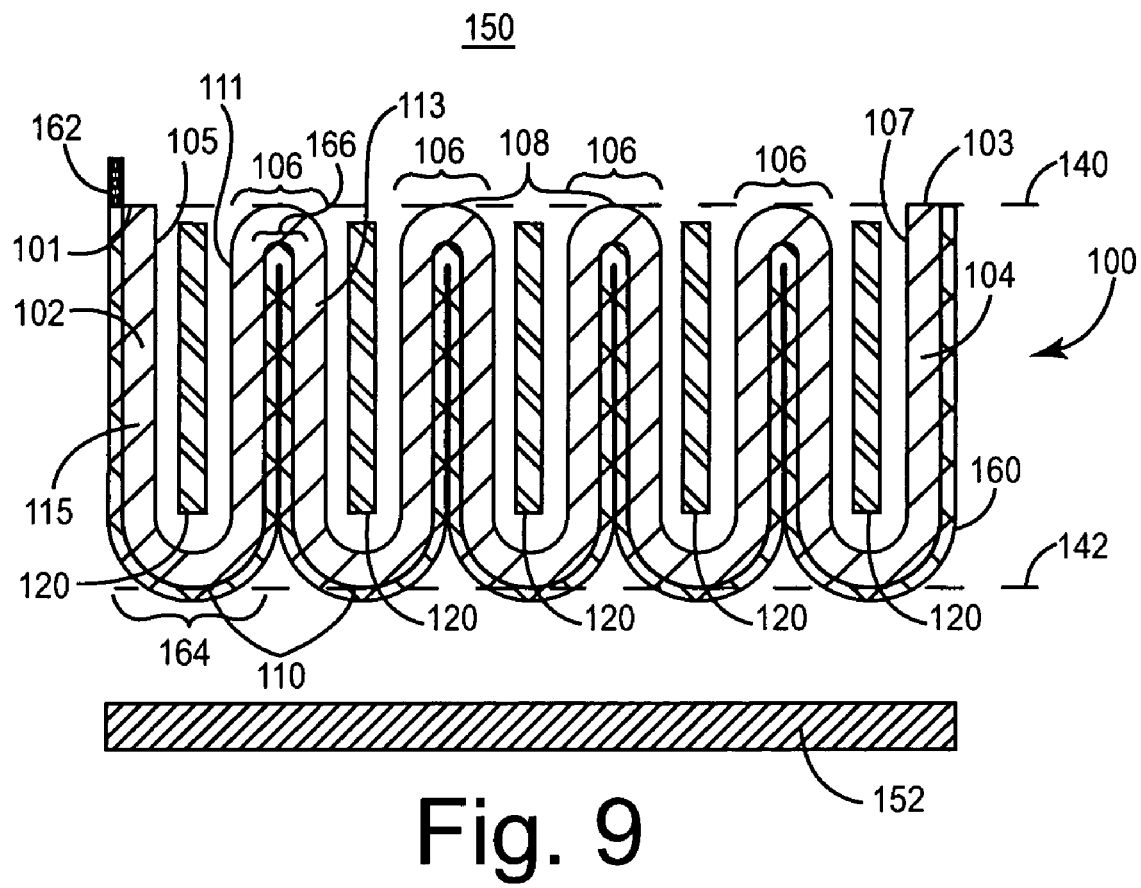
FIG. 9 is a side view of a U-fold electrode structure including a collector.

FIG. 9 is a side view of a U-fold electrode structure including a collector 160. The sheet of electrode material 115 is pressed onto one side 164 of collector 160 which corresponds to an inner side of the U-fold structure which will face opposing electrode 120. Electrode material is not needed on the outer side 166 of collector 160.

The U-fold electrode structure promotes the transfer of heat away from the center of a cathode-anode electrode assembly since heat is conducted through the continuous U-fold structure. In flat electrochemical cell designs having stacked electrode assemblies formed using separate plates of both anode and cathode material arranged in an alternating manner, heat can accumulate in the inner stack layers. By providing a continuous U-fold structure, heat is transferred to surrounding space quickly, reducing the likelihood of thermal damage to the cell. The cell may optionally include a heat sink member 152 designed to collect and dissipate heat from the U-fold electrode structure along the large-radius folds 110. Heat sink member 152 may be positioned adjacent the large-radius folds 110 within the cell encasement, external to the cell encasement, or incorporated in the cover or case of a cell encasement. For example, reference is made to U.S. Pat. No. 6,010,803, issued to Heller, Jr., et al. Heat sink member 152 may be fabricated from any suitable heat conduction material and may be fabricated from the same material as the cell encasement.

Figure 10:
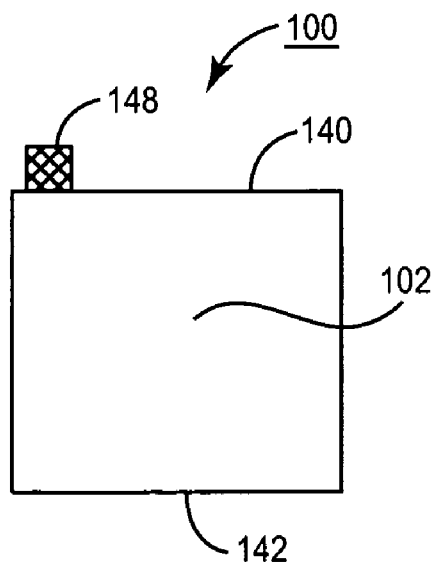
FIG. 10 is an end view of a U-fold electrode structure.

FIG. 10 is an end view of a U-fold electrode structure. U-fold structure 100 includes top side 140 and bottom side 142. Top side 140 and bottom side 142 will be substantially parallel when U-fold structure 150 is formed from a square or rectangular sheet of electrode material 115, as shown in the example of FIG. 6, folded at evenly spaced intervals.

Figure 11:
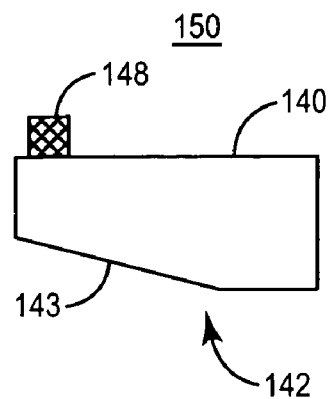
FIG. 11 is an end view of an alternative U-fold electrode structure having a contoured shape.

FIG. 11 is an end view of an alternative U-fold electrode structure having a contoured shape. Bottom side 142 is shown having an angled portion 143 that is not substantially parallel to top side 140. The geometry of bottom side 142 may be designed to form a desired contour or shape by forming U-fold structure 150 from a sheet of electrode material having pre-cut contours formed along the spaced apart intervals 116 corresponding to the location of the large-radius folds which separate the single- and double-layer sections.

Figure 12:
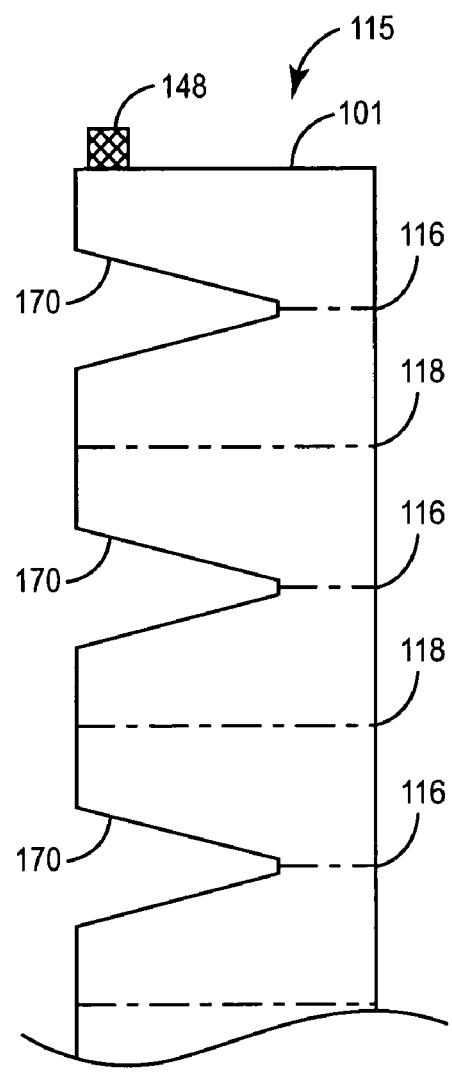
FIG. 12 is a top view of a sheet of electrode material that may be used to form the contoured U-fold structure shown in FIG. 11.

FIG. 12 is an elongated sheet of electrode material 115 that may be used to form the contoured U-fold structure shown in FIG. 11. Along each spaced apart interval 116 corresponding to a large-radius fold location, sheet 115 has been formed with a notch or cut-away contour 170. As sheet 115 is folded with large-radius folds along spaced apart intervals 116 to form separate sections of the U-fold structure, and with small-radius folds along spaced apart interval 118 to form the double-layer sections, a contoured bottom side 142 (FIG. 11) will be formed. Angled portion 143 of bottom side 142 corresponds to the pre-cut contours 170 provided along the large-radius folding intervals 116 of sheet 115.

Figure 13:
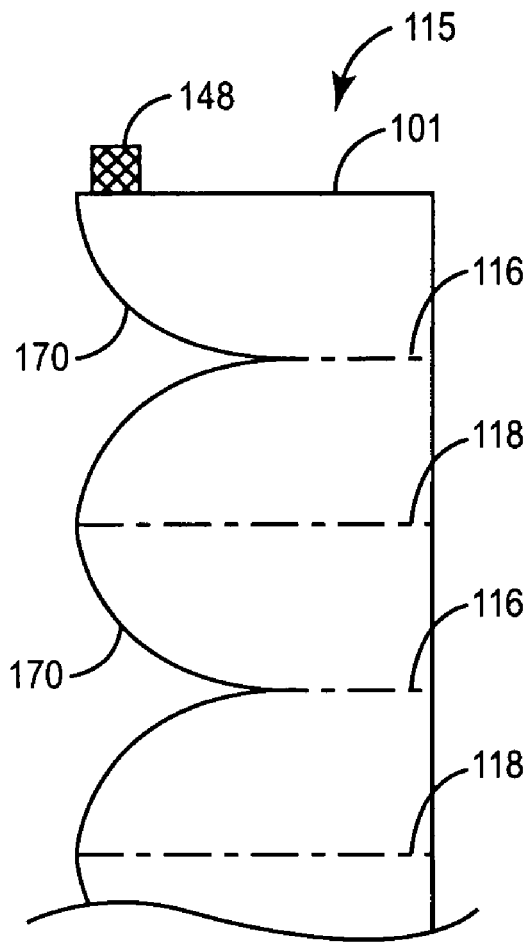
FIG. 13 is a partial plan view of a sheet of electrode material that may be used to form an alternative contoured U-fold electrode structure.
Figure 14:
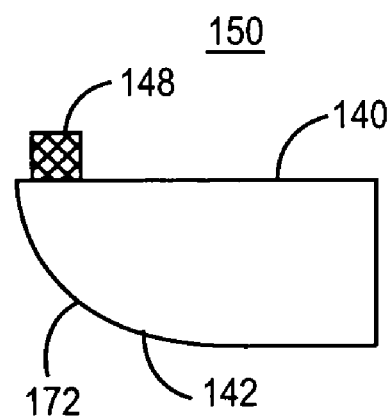
FIG. 14 is an end view of the contoured U-fold structure formed using the sheet of electrode material shown in FIG. 13.

FIG. 13 is a partial plan view of a sheet of electrode material that may be used to form an alternative contoured U-fold electrode structure. It is recognized that numerous contoured shapes may be realized by providing appropriate pre-cut contours along the large-radius folding intervals 116 of sheet 115. FIG. 13, for example, illustrates a sheet 115 having rounded contours 170 formed along large-radius folding intervals 116. FIG. 14 is an end view of the U-fold structure formed using the sheet of electrode material 115 shown in FIG. 13. Bottom side 142 includes a rounded portion 172 corresponding to the pre-cut contour 170 formed along the large-radius folding intervals 116 of sheet 115.

Figure 15:
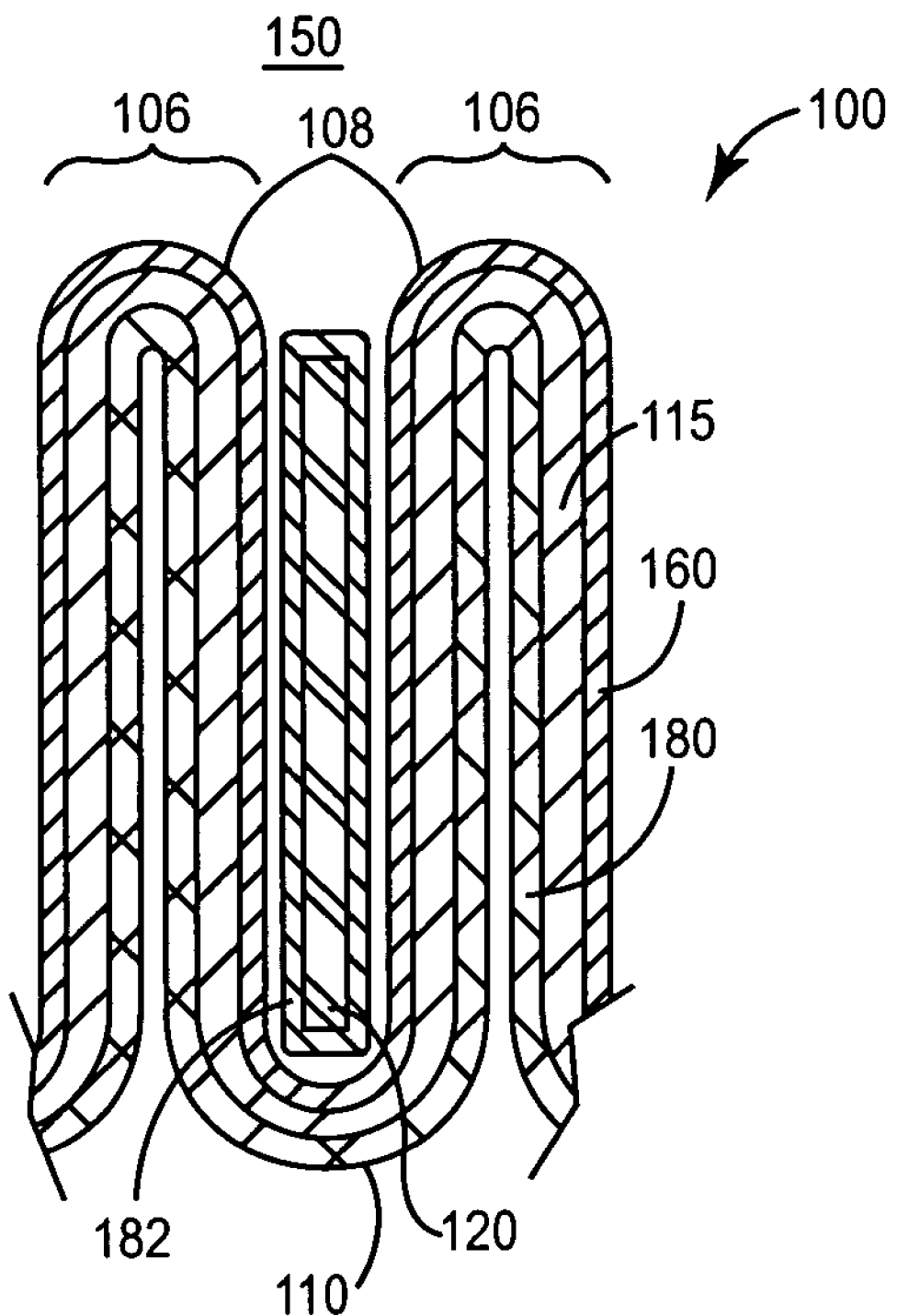
FIG. 15 is a partial sectional view of an electrode assembly including a U-fold electrode structure according to one embodiment of the invention.

FIG. 15 is a partial sectional view of an electrode assembly according to one embodiment of the invention. The electrode assembly 150 includes a U-fold electrode structure 100 formed from a single sheet of electrode material 115 layered with a collector 160 and a separator 180. In the partial view shown, two double layer sections 106 formed by small-radius folds 108 are separated by a large-radius fold 110. An opposing electrode plate 120 is positioned between the double-layer sections 106. The opposing electrode plate 120 is shown enclosed in a separator 182. Electrode plate 120 may be enclosed in an envelope or pouch of separator material, which may be sealed. Alternatively, electrode plate 120 may be wrapped in separator material or layered with separator material such that separator 182 is between the U-fold structure 100 and electrode plate 120. Methods for enclosing or layering separate electrode plates with separator material are known in the art.

The separator 180 included in the U-fold structure 100 is layered on top of the electrode material 115 such that separator 180 is positioned between electrode material 115 and the opposing electrode 120. As such, a double layer of separator material is formed by separator 182 and separator 180 positioned between the electrodes 115 and 120. In some embodiments, a single separator layer may be included by providing a separator layer on U-fold structure 100 or along opposing electrode 120.

Separator layers 180 and 182 may be formed from one or more layers of a suitable material such as cellulose papers (e.g., Kraft paper or Manila paper), porous polymeric materials (e.g. polypropylene, polyethylene, polyethylenetetrafluoroethylene), non-woven glass, glass fiber material, or fabric gauze materials. Separator layers 180 and 182 are provided to prevent shorting between the U-fold electrode material 115 and the opposing electrode plate 120 while still allowing ionic transport between the electrodes to complete the electrical circuit. In stacked electrode assemblies formed from alternating electrode plates or a serpentine electrode wrapped around alternating plates, separator material is required on both sides of the stacked plates or serpentine electrode since the electrode will face the opposing electrode material on both sides. A U-fold electrode structure may be provided with separator 180 only on one side of the electrode material 115 which faces opposing electrode 120.

Figure 16A:
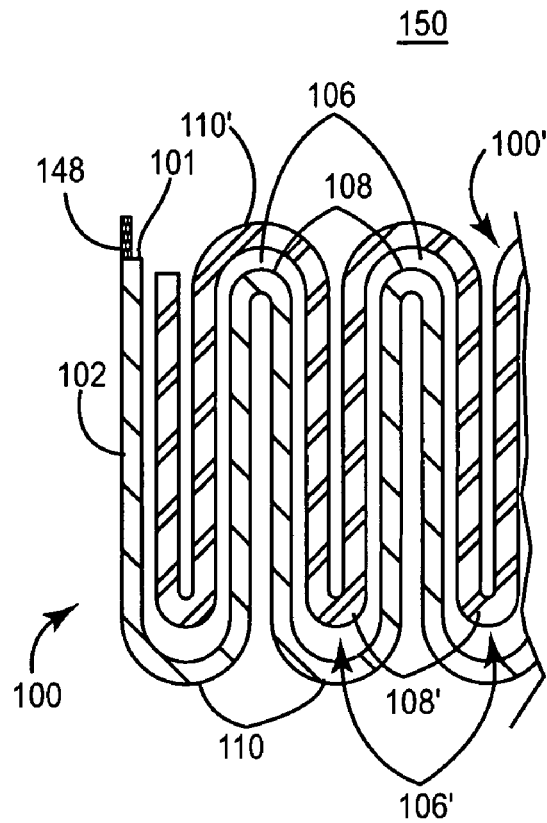
FIG. 16A is a partial side view of an alternative embodiment of an electrode assembly including two U-fold electrode structures.

FIG. 16A is a partial side view of an alternative embodiment of an electrode assembly. Electrode assembly 150 includes two U-fold electrode structures 100 and 100'. U-fold electrode structure 100 includes a single-layer section 102 near end 101 separated from multiple double-layer sections 106. The large-radius folds 110 separate the sections 102 and 106, and the small-radius folds 108 form the double-layer sections 106. U-fold electrode structure 100 is interfaced with the second U-fold electrode structure 100'. The second U-fold electrode structure 100' includes double layer sections 106', formed by small-radius folds 108', and spaced apart from each other by large-radius folds 110'.

Figure 16B:
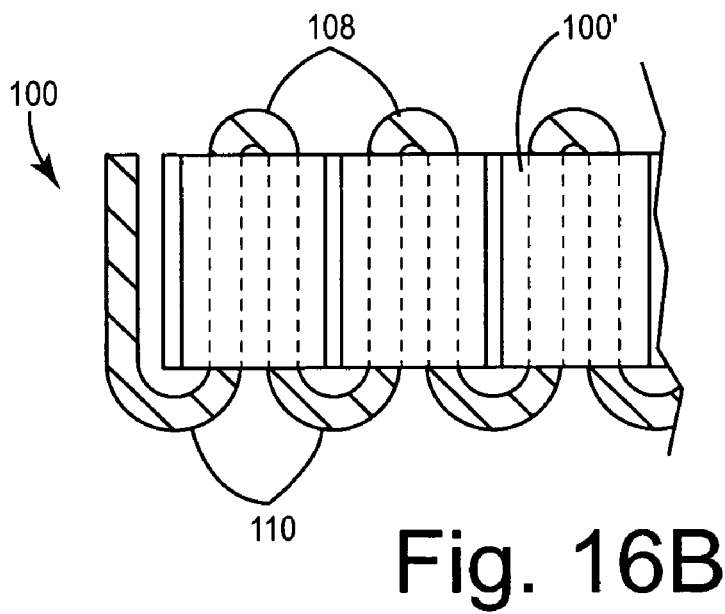
FIG. 16B is a partial side view of an electrode assembly including two U-fold electrode structures oriented at 90 degrees relative to each other.

The two electrode structures 100 and 100' are interfaced by positioning the double-layer sections 106' of electrode structure 100' between the spaced-apart double-layer sections 106 of electrode structure 100. Electrode structure 100 includes single-layer section 102 for interfacing on one side with the first double-layer section 106' of electrode structure 100'. As shown in FIG. 16A, the two U-fold structures 100 and 100' are oriented 180 degrees relative to each other such that the large-radius folds 110' wrap of structure 100' wrap around the small-radius folds 108 of structure 100. Alternatively, the U-fold structures 100 and 100' may be oriented at 90 degrees relative to each other as shown in FIG. 16B. The large-radius folds 110' of U-fold structure 100' wrap around the sides of each double layer section 106 of U-fold structure 100.

Figure 17A:
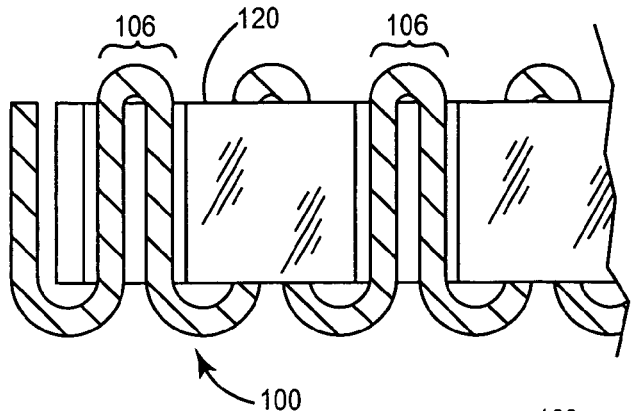
FIG. 17A is side view of an alternative embodiment of an electrode assembly including a U-fold structure and an opposing electrode arranged in a serpentine manner.
Figure 17B:
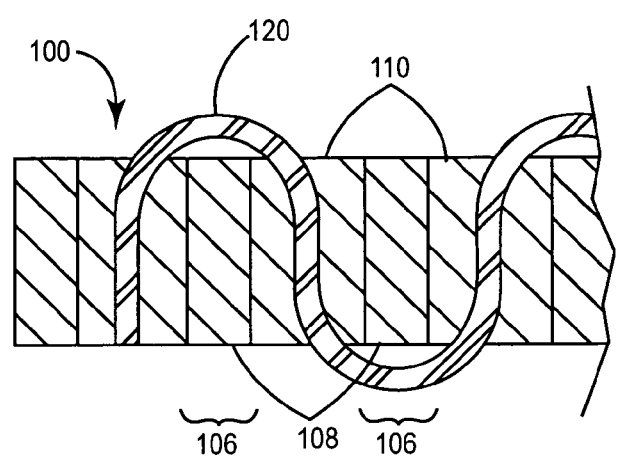
FIG. 17B is a top view of the electrode assembly shown in FIG. 17A.

FIG. 17A is side view of an alternative embodiment of an electrode assembly including a U-fold structure 100 and an opposing electrode 120 arranged in a serpentine manner. Opposing electrode 120 is folded in a serpentine fashion between the spaced apart, double-layer sections 106 of U-fold structure 100. It is recognized that a separator may be layered along the inner side of U-fold structure 100 and/or wrapped in a serpentine manner along with opposing electrode 120 to provide protection against short-circuit between U-fold structure 100 and opposing electrode 120. FIG. 17B is a top view of U-fold electrode structure 100 showing opposing electrode 120 wrapped in a serpentine manner between spaced-apart, double-layer sections 106.

Figure 18:
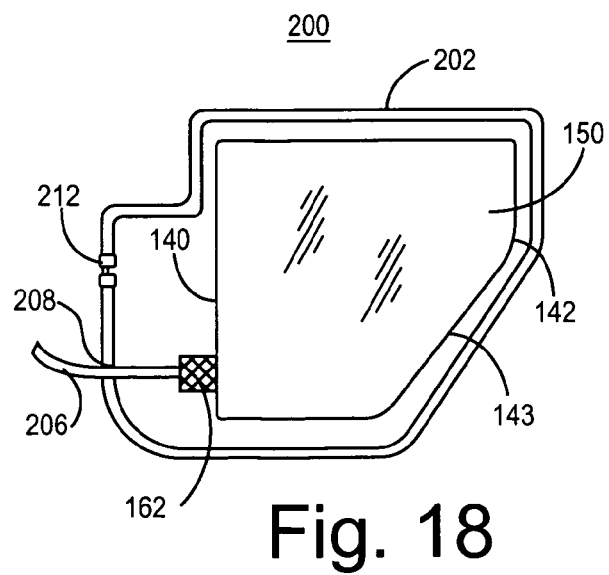
FIG. 18 is an open view of an electrochemical cell according to one embodiment of the invention.

FIG. 18 is an open view of an electrochemical cell according to one embodiment of the invention. Cell 200 includes electrode assembly 150 which includes, as described above, at least one U-fold electrode structure. The U-fold electrode structure may be assembled with an opposing electrode formed from multiple separate plates or a second U-fold structure to form electrode assembly 150. The U-fold structure may include a collector and separator as described previously. U-fold structure is provided with connector tab 162, shown coupled to a lead wire 206 extending to the outside of cell encasement 202 through feedthrough 208. In the case of wet electrochemical cells, a fill port 212 is provided for filling the interior space of encasement 202 with a suitable liquid electrolyte after encasement 202 is sealed. In the embodiment shown, electrode assembly 150 includes an angled portion 143 along bottom side 142 to form a contoured electrode assembly 150 designed to match the contour of cell encasement 202. A contoured cell encasement 202 contributes to volumetric efficiency when used in a contoured housing of an IMD.

In a method for manufacturing an electrochemical cell, U-fold electrode structure 150 is formed as described above. Opposing electrode plates are then positioned between the spaced apart sections of the pre-folded U-fold structure to form an electrode assembly 150. Alternatively, the opposing electrode plates may be laid between U-fold sections as the U-fold structure is folded. After forming the electrode assembly 150, appropriate electrical connections are made between connector tab 162 and lead wire 208 allowing cell 200 to be electrically coupled to an electronics module of an IMD. The electrode assembly 150 is then enclosed in cell encasement 202, which is hermetically sealed. Encasement 202 may be filled with a liquid electrolyte through fill port 212. Fill port 212 and feedthrough 208 are sealed, typically by a fusion welding method such as laser welding.

Thus, an electrochemical cell and method for manufacture have been presented in the foregoing description with reference to specific embodiments. It is appreciated that various modifications to the referenced embodiments may be made without departing from the scope of the invention as set forth in the following claims.

The invention claimed is:

1. An implantable medical device, comprising:
a housing;
an electronics module for performing a device function disposed within the housing; and
an electrochemical cell disposed within the housing and electrically coupled to the electronics module, wherein the electrochemical cell includes a first electrode structure formed from a sheet of electrode material folded along a plurality of spaced apart intervals to form a U-fold structure having a plurality of small-radius folds forming a plurality of double-layer sections and a plurality of large-radius folds for spacing apart the first single-layer section, the plurality of double-layer sections, and the second single-layer section, and wherein a plurality of perforations includes a first set of perforations disposed along the small-radius folds and a second set of perforations disposed along the large-radius folds, the second set of perforations having a greater number of perforations than the first set of perforations and a second electrode structure operatively positioned between the plurality of spaced-apart double-layer sections of the first electrode structure.

2. The implantable medical device of claim 1 wherein the U-fold structure further includes a single-layer section formed near an end of the sheet of electrode material.

3. The implantable medical device of claim 1 wherein the first electrode structure being an anode, and the second electrode structure being a cathode.

4. The implantable medical device of claim 1 wherein the second electrode structure includes a plurality of plates.

5. The implantable medical device of claim 1 wherein the second electrode structure includes a U-fold structure.

6. The implantable medical device of claim 1 wherein the second electrode structure includes a serpentine structure.

7. The implantable medical device of claim 1 wherein the first electrode structure further includes a collector and wherein the sheet of electrode material being adhered to the collector to form an electrode subassembly.

8. The implantable medical device of claim 2 wherein the collector includes a plurality of perforations disposed along the spaced apart intervals to facilitate folding of the electrode subassembly to form the U-fold structure.

9. The implantable medical device of claim 1 wherein the sheet of electrode material includes any of lithium, aluminum.

10. The implantable medical device of claim 1 wherein the first electrode structure further includes a separator material disposed over a surface of the sheet of electrode material.

11. An implantable medical device, comprising:
a housing;
an electronics module for performing a device function disposed within the housing; and
an electrochemical cell disposed within the housing and electrically coupled to the electronics module, wherein the electrochemical cell includes a first electrode structure formed from a sheet of electrode material folded along a plurality of spaced apart intervals to form a U-fold structure having a top side corresponding to a plurality of small-radius folds forming double-layer sections and a bottom side corresponding to a plurality of large-radius folds for spacing apart the plurality of double-layer sections wherein the small-radius folds and the large-radius folds are formed at the spaced-apart intervals in an alternating manner and wherein the spaced-apart intervals are equidistant from each other and a second electrode structure operatively positioned between the plurality of spaced-apart double-layer sections of the first electrode structure.

12. An implantable medical device, comprising:
a housing;
an electronics module for performing a device function disposed within the housing; and
an electrochemical cell disposed within the housing and electrically coupled to the electronics module, wherein the electrochemical cell includes a first electrode structure formed from a sheet of electrode material folded along a plurality of spaced apart intervals to form a U-fold structure having a top side corresponding to a plurality of small-radius folds forming double-layer sections and a bottom side corresponding to a plurality of large-radius folds for spacing apart the plurality of double-layer sections wherein the small-radius folds and the large-radius folds are formed at the spaced-apart intervals in an alternating manner and wherein the spaced-apart intervals are progressively decreasing in size and a second electrode structure operatively positioned between the plurality of spaced-apart double-layer sections of the first electrode structure.

13. The implantable medical device of claim 1 further including a shallow-drawn encasement for enclosing the first electrode structure and the second electrode structure.

14. The implantable medical device of claim 1 further including a heat sink element disposed adjacent the large-radius folds.

* * * * *